US012178255B2

(12) United States Patent
Liu et al.

(10) Patent No.: US 12,178,255 B2
(45) Date of Patent: Dec. 31, 2024

(54) ATOMIZER FOR ELECTRONIC CIGARETTE

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Wei Huang, Hunan (CN); Xinqiang Yin, Hunan (CN); Jianhua Yi, Hunan (CN); Chaoxiang Huang, Hunan (CN); Yongquan Zhou, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 386 days.

(21) Appl. No.: 17/620,096

(22) PCT Filed: Jun. 15, 2020

(86) PCT No.: PCT/CN2020/096014
§ 371 (c)(1),
(2) Date: Dec. 16, 2021

(87) PCT Pub. No.: WO2020/253640
PCT Pub. Date: Dec. 24, 2020

(65) Prior Publication Data

US 2022/0240589 A1 Aug. 4, 2022

(30) Foreign Application Priority Data

Jun. 17, 2019 (CN) ......................... 201910520409.9
Jun. 17, 2019 (CN) ......................... 201920905593.4

(51) Int. Cl.
*A24F 40/485* (2020.01)
*A24F 40/05* (2020.01)
(Continued)

(52) U.S. Cl.
CPC ............ *A24F 40/485* (2020.01); *A24F 40/05* (2020.01); *A24F 40/10* (2020.01); *A24F 40/44* (2020.01);
(Continued)

(58) Field of Classification Search
None
See application file for complete search history.

(56) References Cited

FOREIGN PATENT DOCUMENTS

CN 105795525 A 7/2016
CN 206025225 U 3/2017
(Continued)

OTHER PUBLICATIONS

International Search Report issued in International Application No. PCT/CN2020/096014 dated Sep. 16, 2020, 3 pages.

*Primary Examiner* — Katherine A Will
(74) *Attorney, Agent, or Firm* — MASCHOFF BRENNAN; Michael Mauriel

(57) ABSTRACT

An atomizer for an electronic cigarette is provided. The atomizer comprises a liquid cartridge device with a liquid outlet, atomization cotton, and an ultrasonic atomization piece. The middle of the atomization cotton abuts against a central area of the ultrasonic atomization piece by means of a spring to form an atomization zone. An end portion of the atomization cotton is pressed against the bottom of the liquid cartridge device and covers the liquid outlet. An atomization cavity is provided between the ultrasonic atomization piece and the bottom of the liquid cartridge device. An atomization cavity gas inlet and an atomization cavity gas outlet are provided at the top of the atomization cavity. The atomization cavity gas inlet (501) and the liquid outlet (321) are staggered.

13 Claims, 10 Drawing Sheets

(51) Int. Cl.
*A24F 40/10* (2020.01)
*A24F 40/44* (2020.01)
*B05B 17/06* (2006.01)

(52) U.S. Cl.
CPC ...... *B05B 17/0653* (2013.01); *B05B 17/0684* (2013.01)

(56) References Cited

FOREIGN PATENT DOCUMENTS

| | | | |
|---|---|---|---|
| CN | 206354425 | U | 7/2017 |
| CN | 206949542 | U | 2/2018 |
| CN | 108903064 | A | 11/2018 |
| CN | 210114048 | U | 2/2020 |
| CN | 210169053 | U | 3/2020 |
| CN | 210169054 | U | 3/2020 |
| CN | 210169055 | U | 3/2020 |
| CN | 210275920 | U | 4/2020 |
| EP | 3 272 238 | A1 | 1/2018 |
| KR | 10-2010-0097807 | A | 9/2010 |

ATOMIZER FOR ELECTRONIC CIGARETTE

CROSS REFERENCE TO RELATED APPLICATIONS

This application is a U.S. National Phase application under 35 U.S.C. § 371 of International Application No. PCT/CN2020/096014 filed on Jun. 15, 2020 and claims priority to Chinese Application No. 201910520409.9 filed on Jun. 17, 2019 and Chinese Application No. 201920905593.4 filed on Jun. 17, 2019. The entire contents of these applications are hereby incorporated herein by reference.

FIELD OF THE INVENTION

The present invention relates to an electronic cigarette utensil, in particular to an atomizer for an electronic cigarette.

BACKGROUND OF THE INVENTION

In an existing ultrasonic atomizer for an electronic cigarette, a gas inlet of an atomization cavity and a liquid outlet are substantially disposed at the same position. So when smoking, gas flows to accelerate the flowing of e-liquid on atomization cotton to the surface of an ultrasonic atomization piece, and the ultrasonic atomization piece is easily soaked in the e-liquid. As a result, the atomization efficiency is low, large smoke particles are produced due to insufficient atomization of the e-liquid, and even the e-liquid is inhaled by user, which affects the amount of smoke and the smoke taste and results in poor user experience.

SUMMARY OF THE INVENTION

The technical problem to be solved by the present invention is to overcome the shortcomings of the prior art and provide an atomizer for an electronic cigarette, which can stabilize an e-liquid flow guide speed, thereby preventing the ultrasonic atomization piece from being soaked in e-liquid and reducing the probability that a user inhales the e-liquid.

In order to solve the above technical problems, the technical solution adopted by the present invention is: an atomizer for an electronic cigarette, including a liquid cartridge device with a liquid outlet, strip-shaped atomization cotton, and an ultrasonic atomization piece, wherein the middle part of the atomization cotton abuts against a central area of the ultrasonic atomization piece by means of a spring to form an atomization zone, and an end portion of the atomization cotton is pressed against the bottom of the liquid cartridge device and covers the liquid outlet; an atomization cavity is formed between the ultrasonic atomization piece and the bottom of the liquid cartridge device, and a gas inlet of the atomization cavity and a gas outlet of the atomization cavity are disposed at the top of the atomization cavity; the gas inlet of the atomization cavity is misaligned with the liquid outlet, and an angle between the gas inlet of the atomization cavity and the liquid outlet is in a range of 30 to 180 degrees, so that the gas flow direction at the gas inlet of the atomization cavity is misaligned with the flow direction of the e-liquid on the atomization cotton flows; and a gas flow between the gas inlet of the atomization cavity and the gas outlet of the atomization cavity has a turning, so that the gas flow at the gas inlet of the atomization cavity does not influence the flow rate of the e-liquid on the atomization cotton and the distribution of e-liquid in the atomization zone.

In this way, the gas flow speed at the gas inlet of the atomization cavity does not affect the flow rate of e-liquid on the atomization cotton, and does not affect the distribution of e-liquid on the atomization surface of the ultrasonic atomization piece (e-liquid at the contact position of the atomization cotton and the ultrasonic atomization piece), so that the stability of an e-liquid flow guide speed is good, the ultrasonic atomization piece can be prevented from being soaked in e-liquid, and the atomization efficiency can be improved. Meanwhile, the gas flow between the gas inlet of the atomization cavity and the gas outlet of the atomization cavity has a turning, and this gas flow has little effect on the flowing force of air closed to the ultrasonic atomization piece, so the gas flow between the gas inlet of the atomization cavity and the gas outlet of the atomization cavity has little effect on the e-liquid on the surface of the ultrasonic atomization piece, and the atomizing rate of the ultrasonic atomization piece is stable, thereby reducing the probability that a user inhales the e-liquid. Further, the gas outlet of the atomization cavity is disposed at a central position facing the atomization zone, so that smoke atomized by the ultrasonic atomization piece can be directly discharged from the gas outlet, and the temperature of the smoke reaching the user's mouth is maintained at 25 to 38 degrees Celsius, with better smoke taste.

Further, the gas outlet of the atomization cavity is connected to a gas outlet channel, and the diameter of the gas outlet of the atomization cavity is greater than that of the gas outlet channel. In this way, the gas outlet of the atomization cavity can collect splashing e-liquid droplets that are not fully atomized in the ultrasonic atomization process of the ultrasonic atomization piece, and the gas flow speed at the gas outlet of the atomization cavity is less than that in the gas outlet channel, so that the gas flow speed changes rapidly at the joint of the gas outlet of the atomization cavity and the gas outlet channel, the probability of collision of smoke at the gas outlet of the atomization cavity is increased, and large particles of smoke are condensed on the side wall of the gas outlet of the atomization cavity, which prevents the user from inhaling the e-liquid particles, thereby improving smoke taste.

Further, the end portion of the atomization cotton is pressed against the bottom of the liquid cartridge device by means of a mounting seat of the atomization cotton, a groove that is opposite to the liquid outlet and is communicated with the atomization cavity is disposed on the upper surface of the mounting seat of the atomization cotton, the middle of the end portion of the atomization cotton is suspended and covers the groove, and two sides of the end portion of the atomization cotton are pressed against the end face of the liquid outlet of the liquid cartridge device by the mounting seat of the atomization cotton, so that only the position on the atomization cotton corresponding to the groove is an e-liquid guiding zone of the atomization cotton. In this way, the liquid outlet is communicated with the atomization cavity through the groove, so that outside air in the atomization cavity can enter a liquid cartridge, thus the gas pressure in the liquid cartridge is increased, and the e-liquid is guided out more smoothly. In addition, the pressed parts on the two sides of the end portion of the atomization cotton in the present invention are pressed too tight to guide the e-liquid, so the e-liquid can only be guided through the e-liquid guiding zone of the atomization cotton, so that the flow rate of the e-liquid is controlled, the ultrasonic atomization piece will not be soaked in the e-liquid. Meanwhile, the atomization cotton can also be prevented from falling into the groove, so that the speed of replacement between e-liquid and gas in the liquid cartridge and the liquid guide speed will not be affected, thus dry burning of the ultrasonic atomization piece will not occur.

Further, the groove includes a first groove and a second groove communicated with each other, and both of the first grooves and the second grooves are symmetrically disposed, and the gas inlet of the first groove is smaller than that of the second groove. As such, e-liquid droplets in the first groove can be discharged through the second groove, so the first groove can be prevented from being blocked by the e-liquid droplets. In addition, the gas in the atomization cavity enters the first groove from the second groove, passes through the atomization cotton via the first groove and the second groove, and enters the liquid cartridge from the liquid outlet, so that the e-liquid in the liquid cartridge and the gas are replaced more smoothly, which ensures the flow rate of the e-liquid, and enables the ultrasonic atomization piece to have a good effect of atomizing the e-liquid, so as to avoid the phenomenon of dry burning of the ultrasonic atomization piece.

Further, the gas outlet of the first groove is greater than the diameter of the liquid outlet.

Further, first fixing grooves are further symmetrically disposed on the upper surface of the mounting seat of the atomization cotton, and two ends of the atomization cotton are respectively inserted into the first fixing grooves and cover the first groove and the second groove.

Further, the first fixing grooves, the first groove, and the second groove are sequentially disposed on the upper surface of the mounting seat of the atomization cotton from outside to inside.

Further, the ultrasonic atomization piece is disposed on an atomization seat, a second fixing groove and a limiting ring are disposed on the atomization seat, and the ultrasonic atomization piece is nested in the second fixing groove and limited in the atomization seat through the limiting ring, which can effectively prevent the ultrasonic atomization piece from falling out of the atomization seat or moving relative to the atomization seat, avoid the phenomena of tilting of the ultrasonic atomization piece that is not assembled stably and dry burning caused by insufficient contact with the e-liquid, and improve the stability of the assembled ultrasonic atomization piece.

Further, an upper surface electrode of the ultrasonic atomization piece is electrically connected to an outer electrode, a lower surface electrode of the ultrasonic atomization piece is electrically connected to an inner electrode, a resistance board is clamped between the outer electrode and the inner electrode, a resistor is disposed on the resistance board, one end of the resistor is electrically connected to the upper surface electrode of the ultrasonic atomization piece via the outer electrode, and the other end is electrically connected to the lower surface electrode of the ultrasonic atomization piece via the inner electrode. In this way, after the atomizer is powered off, the ultrasonic atomization piece and the resistor on the resistance board form a closed circuit, to consume the energy stored by the ultrasonic atomization piece which is powered on and then powered off, so that the ultrasonic atomization piece can work normally after powered on again, and the ultrasonic atomization piece is prevented from generating instantaneous high voltage after powered on again and thus the other electronic components are prevented from burning out, so the use cost of the atomizer will not be increased. In addition, because the resistance board is clamped between the outer electrode and the inner electrode, the resistance board is convenient to assemble and stable in installation, which reduces the manufacturing cost of the atomizer.

Further, the outer electrode is sleeved on the atomization seat, the upper end of the outer electrode straddles the top surface of the atomization seat and is provided with a downward bent abutting portion, a convex conductive ring is disposed on the abutting portion, and the outer electrode abuts against the upper surface electrode of the ultrasonic atomization piece through the conductive ring to realize electrical connection. In this way, the electrical connection between the outer electrode and the ultrasonic atomization piece does not require welding of electronic wires, so that the assembly is convenient and the electrical connection is stable.

Further, the lower part of the atomization seat is recessed with an insertion end, the atomization seat is mounted on a connecting electrode, and the insertion end is inserted into the inner cavity of the connecting electrode and positioned, so that the connection is stable, the assembly is convenient and quick, and the cost is low.

Further, the inner electrode includes an electrode holder, a clamping column and a boss are disposed on the electrode holder, an insertion port for inserting the electrode holder and a clamping port clamped with the boss are disposed on the resistance board, the insertion port is connected with the clamping port, and the resistance board is sleeved on the electrode holder via the insertion port, and is clamped and fixed with the clamping column and the boss of the electrode holder via the clamping port. In this way, when assembling, the resistance board is inserted into the electrode holder through its insertion port, then the resistance board is pushed so that the clamping port of the resistance board is clamped on the clamping column of the electrode holder and abuts against the boss, so the resistance board can be stably clamped, and the electrode holder and the resistance board form a circuit connection without being fixed by screws, so that the assembly is simple and the manufacturing cost is reduced.

Further, the opening of the clamping port matches the shape of the clamping column, so that the assembly of the resistance board and the electrode holder is more stable.

Further, a fourth groove is disposed at the lower part of the outer electrode, a slightly higher support platform is disposed on the fourth groove, the lower surface of the resistance board is placed on the support platform, and the upper surface of the resistance board abuts against the boss of the electrode holder. In this way, after the resistance board is inserted into the electrode holder, when the clamping port of the resistance board is moved to clamp the clamping column and boss of the electrode holder, the fourth groove is not in contact with the resistance board, so that the friction is reduced during the movement of the resistance board, more labor is saved, and the assembly is more convenient.

Further, the liquid cartridge device is formed by engaging an inner liquid cartridge shell and an outer liquid cartridge shell, and the liquid outlet is disposed on the outer liquid cartridge shell.

Further, a rotatable handle is disposed at the middle part of the liquid cartridge device, and a suction nozzle device is sleeved on the top of the rotatable handle, so that the suction nozzle device is rotatable relative to the rotatable handle to open or close a liquid injection port of the liquid cartridge device. The suction nozzle device is provided with a suction nozzle and a gas inlet, a gas outlet channel communicated with the suction nozzle and the atomization cavity are disposed at the middle part of the rotatable handle, and a gas inlet channel communicated with the gas inlet and the atomization cavity is disposed on the periphery of the rotatable handle, thereby providing a complete gas flow path for the atomizer.

Based on the same inventive concept, the present invention further provides an atomizer for an electronic cigarette, including a liquid cartridge device with a liquid outlet, atomization cotton, and an ultrasonic atomization piece, wherein the middle part of the atomization cotton abuts against a central area of the ultrasonic atomization piece by means of a spring to form an atomization zone, and an end portion of the atomization cotton is pressed against the bottom of the liquid cartridge device and covers the liquid outlet; an atomization cavity is formed between the ultrasonic atomization piece and the bottom of the liquid cartridge device, and a gas inlet of the atomization cavity and a gas outlet of the atomization cavity are disposed at the top of the atomization cavity; the gas inlet of the atomization cavity is misaligned with the liquid outlet, so that the gas flow direction at the gas inlet of the atomization cavity is misaligned with the flow direction of the e-liquid on the atomization cotton, and a gas flow between the gas inlet of the atomization cavity and the gas outlet of the atomization cavity has a turning; and a gas distribution valve is disposed at the gas outlet of the atomization cavity, at least one groove is disposed on the periphery of the gas distribution valve, and the gas outlet of the atomization cavity is communicated with the atomization cavity through the groove.

In the present invention, a gas distribution valve is disposed at the gas outlet of the atomization cavity, and at least one groove is disposed on the periphery of the gas distribution valve, so that the gas outlet of the atomization cavity can only communicate with the atomization cavity through the groove, the smoke generated by ultrasonic atomization is blocked by the middle part of the gas distribution valve and reflected back to the atomization cavity before it can be taken out by the inlet gas flow via the groove, e-liquid droplets that are not fully atomized during ultrasonic atomization process or splash out return to the atomization cavity, and the user is prevented from inhaling the e-liquid to affect smoke taste.

Further, a smoke blocking groove for preventing smoke from directly spraying out of the atomization cavity is disposed at the bottom of the gas distribution valve, and the smoke blocking groove is opposite to the atomization zone, which can not only block the e-liquid droplets that are not fully atomized during the operation of the ultrasonic atomization piece or splash out from directly entering the gas outlet channel to prevent the user from inhaling the e-liquid, but also can enable the smoke blocked by the smoke blocking groove and reflected to be more delicate, thereby improving smoke taste.

Further, the distance between the smoke blocking groove and the ultrasonic atomization piece is 1 mm to 20 mm.

Figure 1:
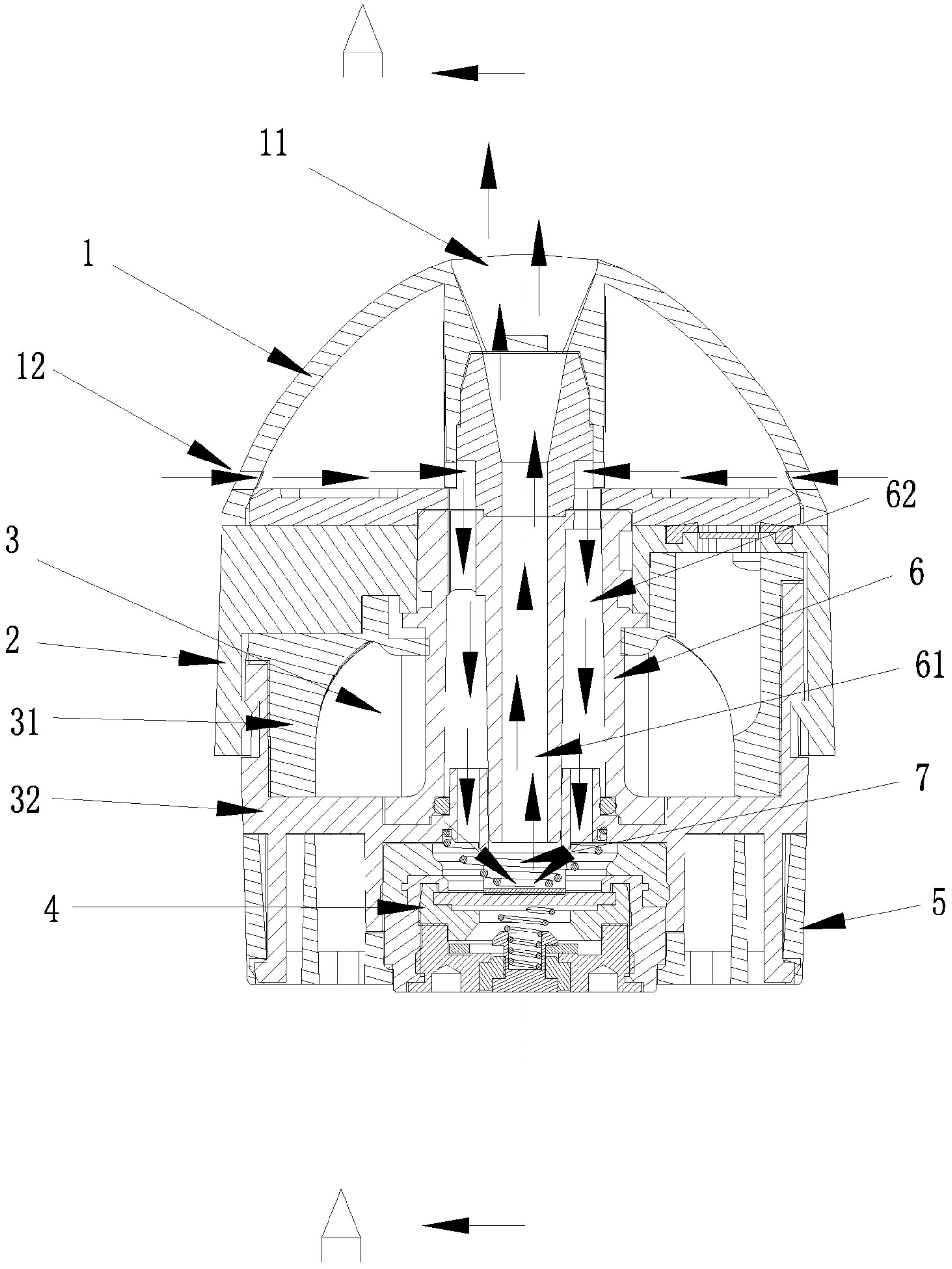
FIG. 1 is a cross-sectional structural diagram of a first embodiment of an atomizer for an electronic cigarette according to the present invention.
Figure 2:
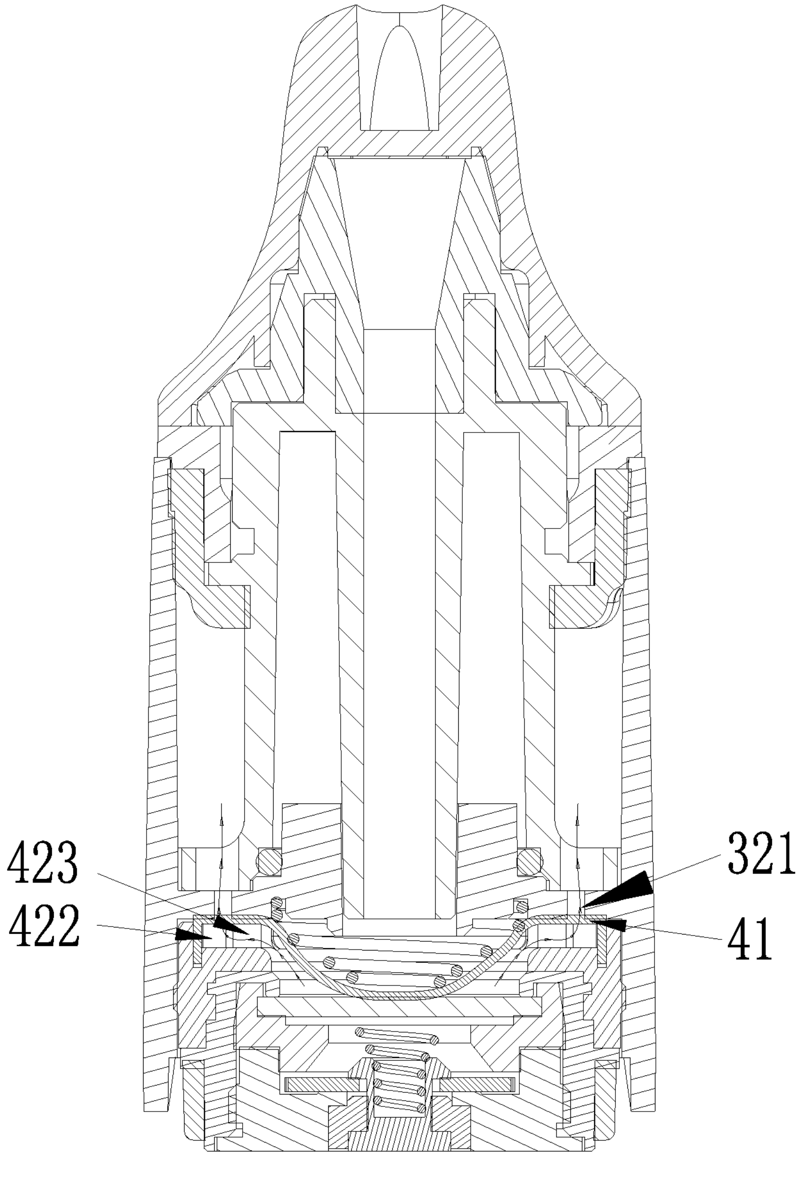
FIG. 2 is an A-A cross-sectional view in FIG. 1.
Figure 3:
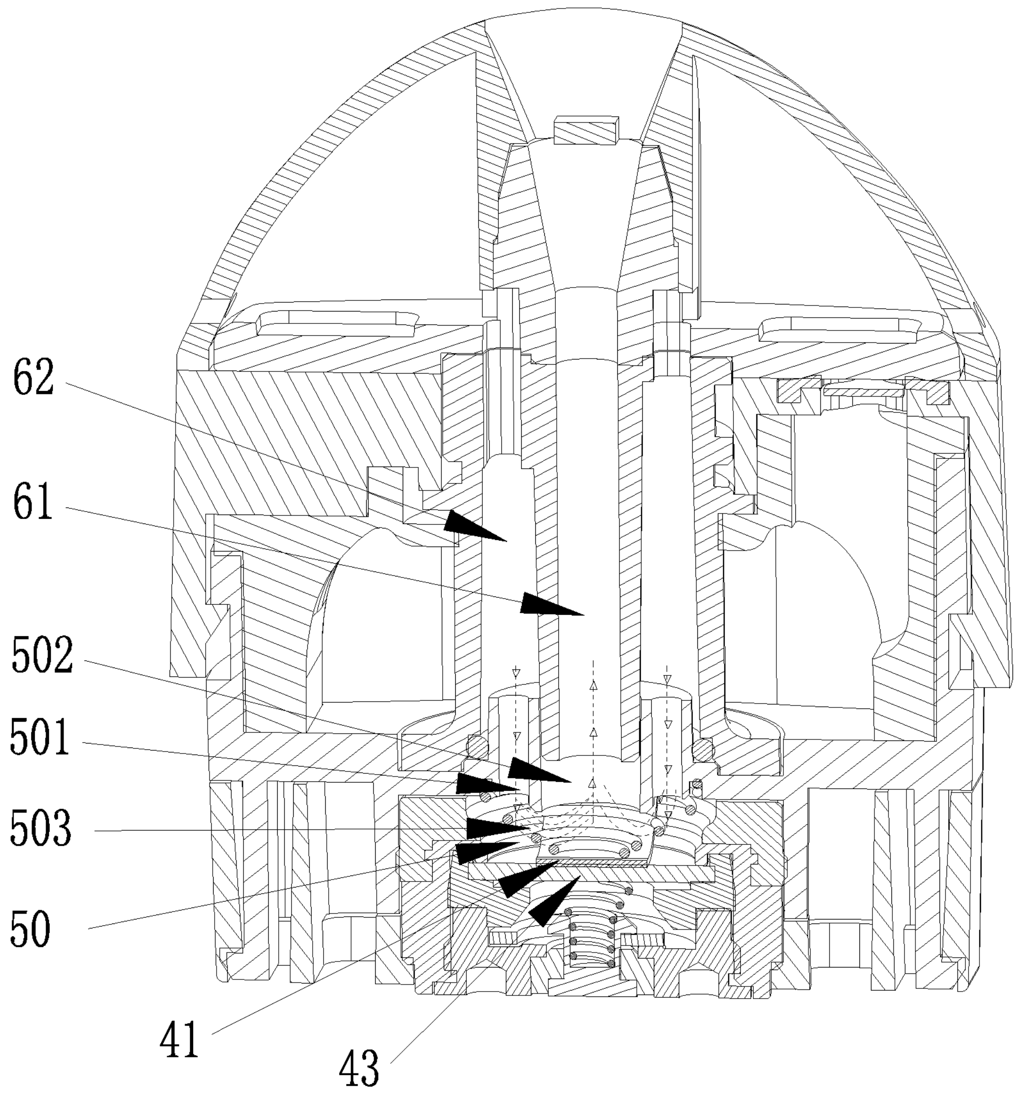
FIG. 3 is a three-dimensional cross-sectional structural diagram of the first embodiment of the atomizer for the electronic cigarette according to the present invention.
Figure 4:
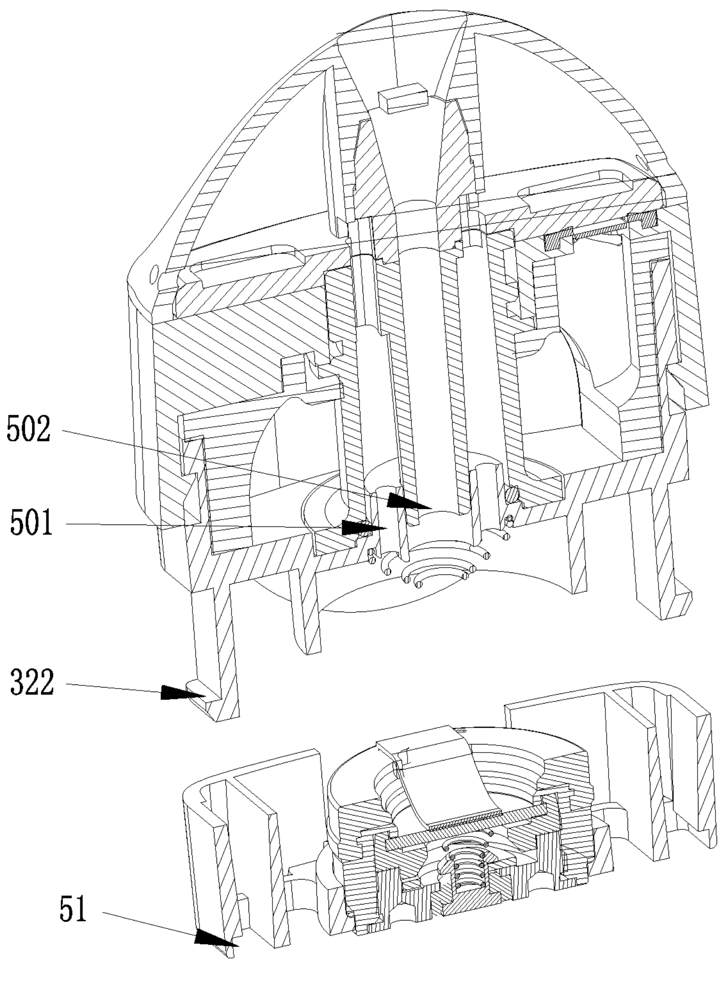
FIG. 4 is a three-dimensional diagram of a split structure of an outer liquid cartridge shell and a bottom cover in the first embodiment of the atomizer for the electronic cigarette according to the present invention.
Figure 5:
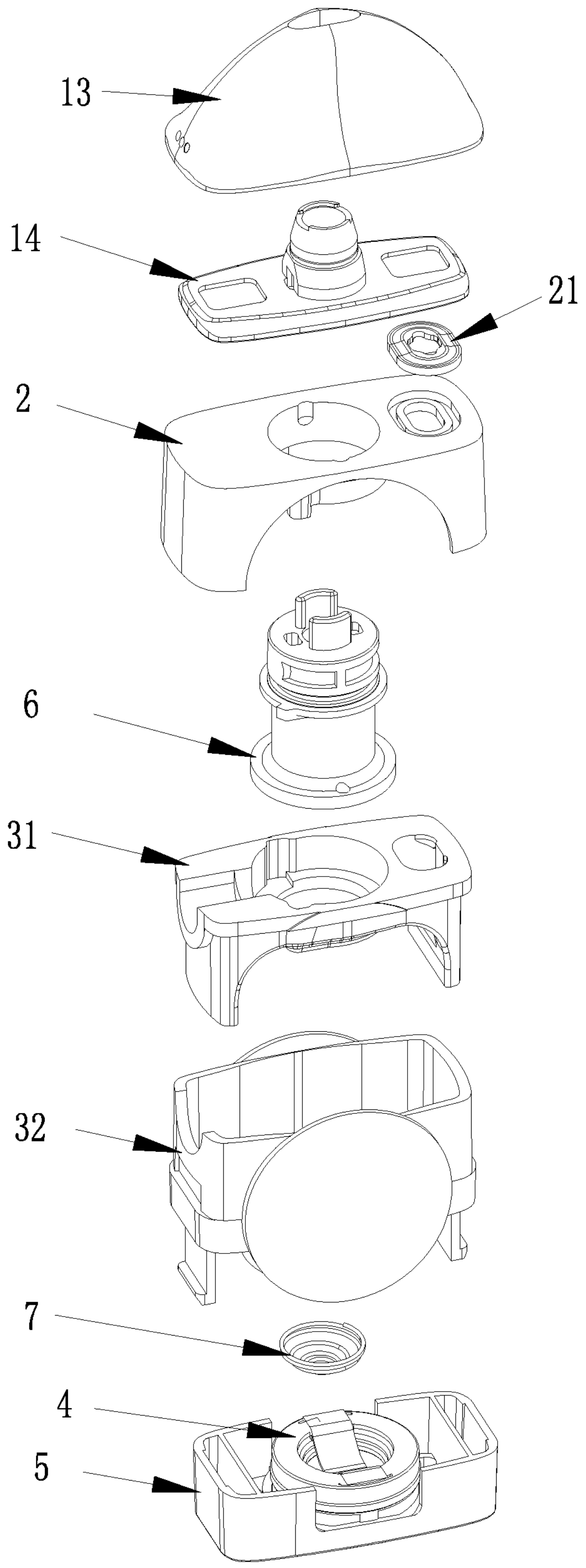
FIG. 5 is an exploded view of components in the first embodiment of the atomizer for the electronic cigarette according to the present invention.
Figure 6:
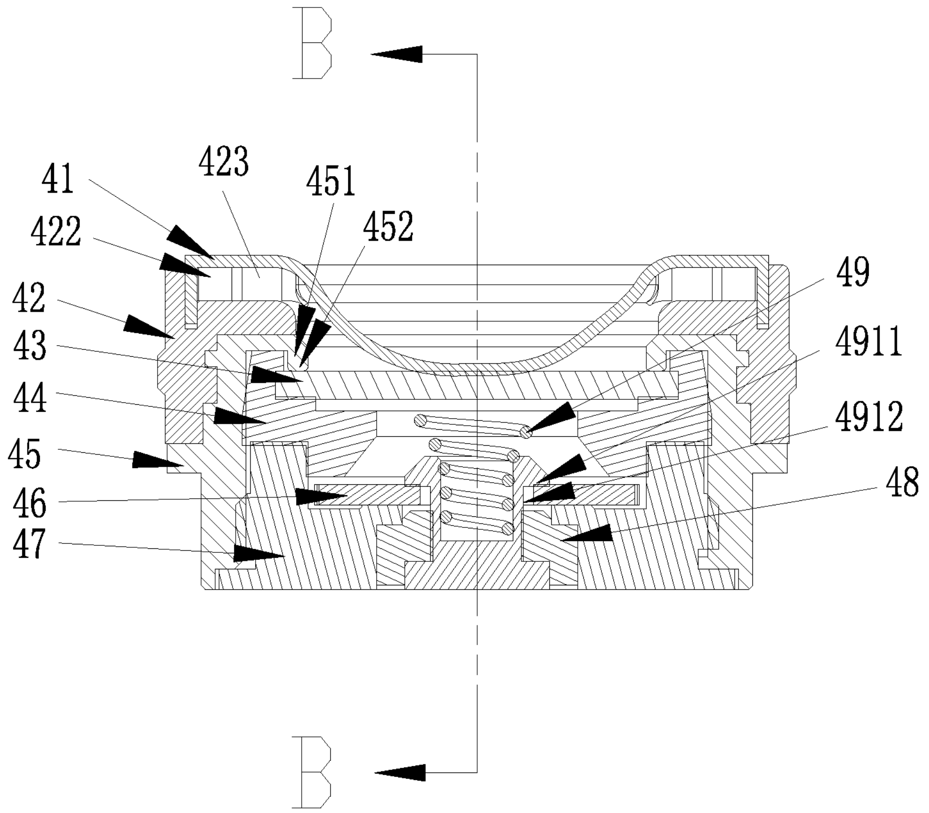
FIG. 6 is a front cross-sectional structural diagram of an atomization core of the present invention.
Figure 7:
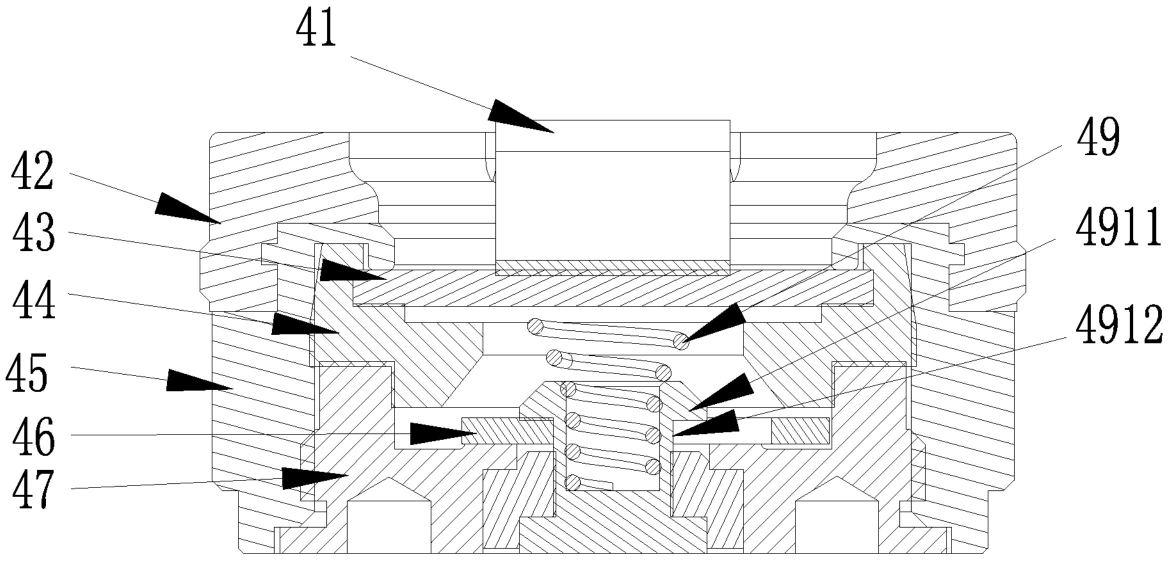
FIG. 7 is a B-B cross-sectional view in FIG. 6.
Figure 8:
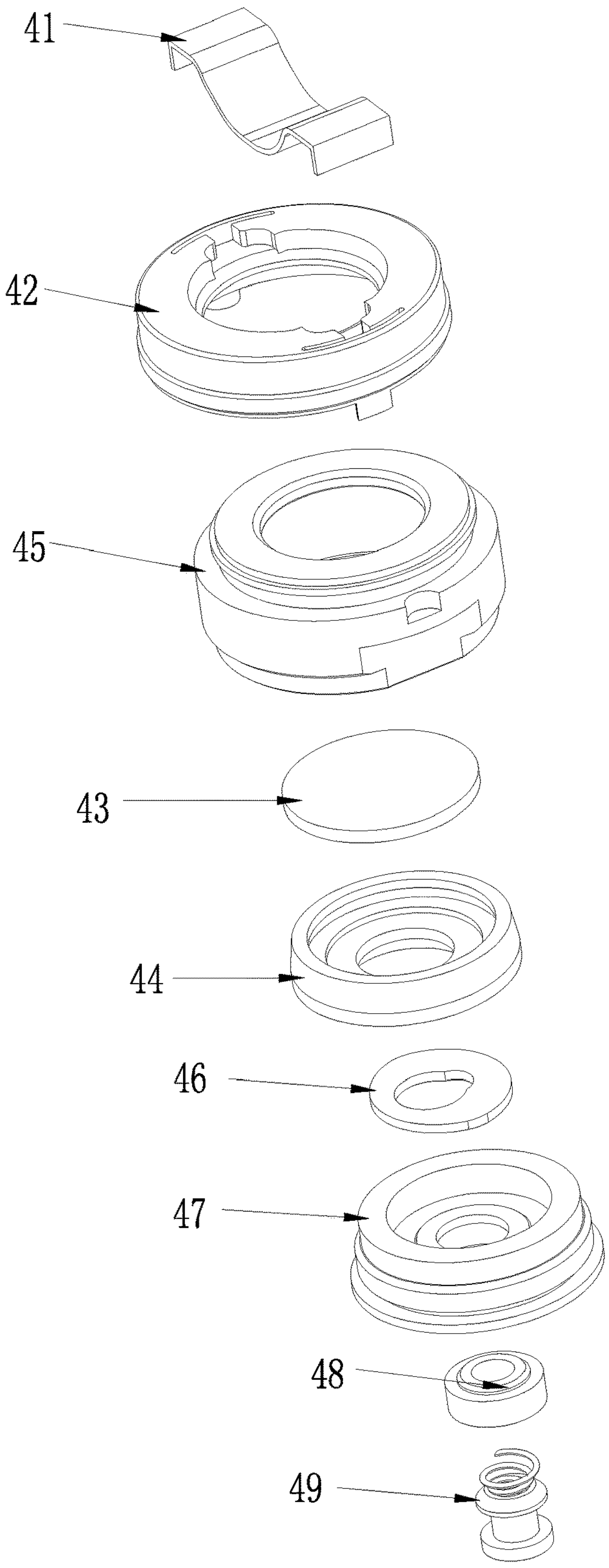
FIG. 8 is an exploded view of components of the atomization core of the present invention.
Figure 9:
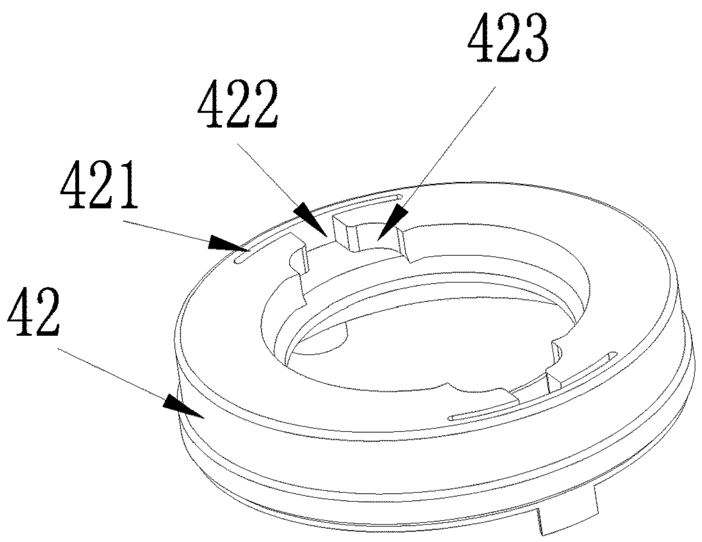
FIG. 9 is a three-dimensional structural diagram of a mounting seat of the atomization cotton of the present invention.
Figure 10:
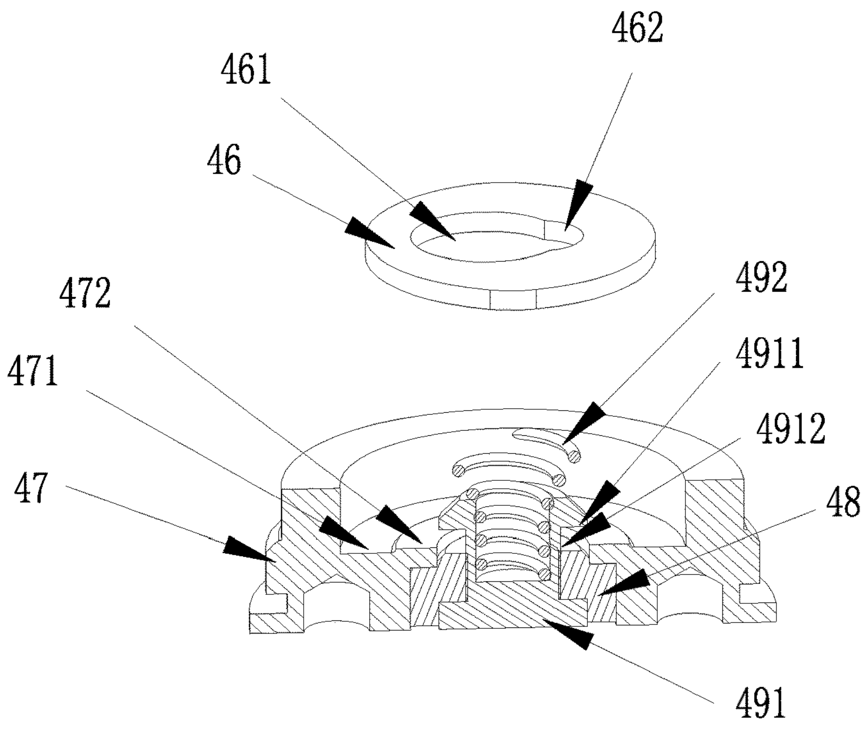
FIG. 10 is an exploded structural diagram of a resistance board, a connecting electrode and an inner electrode of the present invention.
Figure 11:
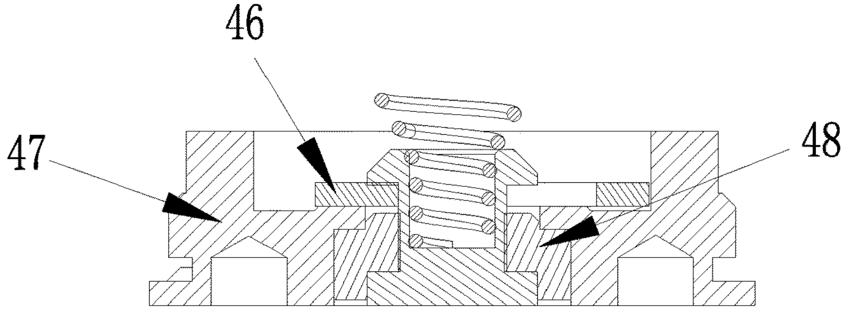
FIG. 11 is a diagram of a combined structure of the resistance board, the connecting electrode and the inner electrode of the present invention.
Figure 12:
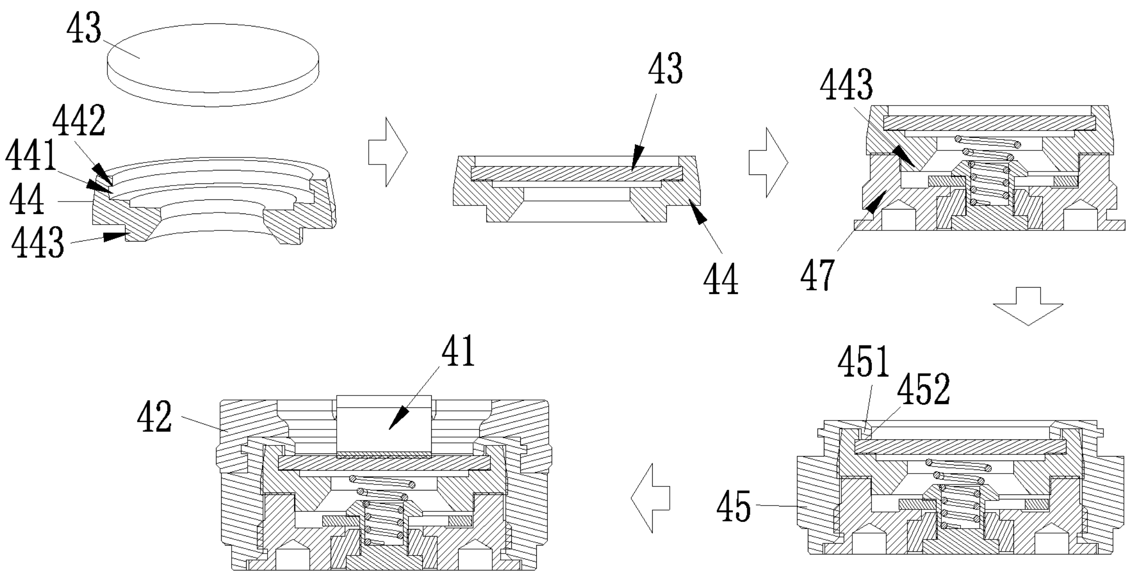
FIG. 12 is an assembly process diagram of the atomization core of the present invention.

In the figures: 1—suction nozzle device; 11—suction nozzle; 12—gas inlet; 13—rotatable cover; 14—rotatable plate;

- 2—pressing cover; 21—silica gel pad;
- 3—liquid cartridge device; 31—inner liquid cartridge shell; 32—outer liquid cartridge shell; 321—liquid outlet; 322—hook;
- 4—atomization core; 41—atomization cotton; 42—mounting seat of the atomization cotton; 43—ultrasonic atomization piece; 44—atomization seat; 45—outer electrode; 46—resistance board; 47—connecting electrode; 48—insulating ring; 49—inner electrode; 50—atomization cavity; 421—first fixing groove; 422—first groove; 423—second groove; 441—second fixing groove; 442—limiting ring; 443—insertion end; 451—abutting portion; 452—conductive ring; 461—insertion port; 462—clamping port; 471—fourth groove; 472—support platform; 491—electrode holder; 492—elastic electrode; 4911—boss; 4912—clamping column; 501—gas inlet of the atomization cavity; 502—gas outlet of the atomization cavity; 503—turning;
- 5—bottom cover; 51—clamping groove;
- 6—rotatable handle; 61—gas outlet channel; 62—gas inlet channel;
- 7—spring;
- 8—gas distribution valve; 80—disc-shaped body; 81—fixed section; 82—groove; 83—circular ring; 84—smoke blocking groove.

DETAILED DESCRIPTION OF THE EMBODIMENTS

The present invention will be further described below with reference to specific preferred embodiments, but the scope of protection of the present invention is not limited thereby.

For ease of description, the relative positional relationships (e.g., upper, lower, left, right, etc.) of components are described according to the layout direction of the accompanying drawings in the specification, and do not limit the structure of this patent application.

Embodiment 1

As shown in FIGS. 1-12, a first embodiment of an atomizer for an electronic cigarette according to the present invention includes a suction nozzle device 1, a liquid cartridge device 3, and an atomization core 4. The suction nozzle device 1 is provided with a suction nozzle 11 and a gas inlet 12. The liquid cartridge device 3 is formed by engaging an inner liquid cartridge shell 31 and an outer liquid cartridge shell 32, and a liquid outlet 321 is disposed at the bottom of the outer liquid cartridge shell 32. A pressing cover 2 covers the inner liquid cartridge shell 31 and the outer liquid cartridge shell 32, hooks 322 are disposed at the bottom of the outer liquid cartridge shell 32, clamping grooves 51 matching the hooks 322 are disposed on a bottom cover 5, and an atomization core 4 is clamped and fixed to the middle part of the bottom cover 5. The hooks 322 of the outer liquid cartridge shell 32 are inserted into the clamping grooves 51 of the bottom cover 5, so the liquid cartridge device 3 is clamped and fixed with the bottom cover 5, and the middle part of the lower surface of the outer liquid cartridge shell 32 abuts against the upper surface of the atomization core 4, so that the atomization core 4 is convenient and fast to disassemble and assemble, with low cost.

The atomization core 4 includes atomization cotton 41, a mounting seat of the atomization cotton 42, an ultrasonic atomization piece 43, an atomization seat 44, an outer electrode 45, a resistance board 46, a connecting electrode 47, an insulating ring 48, and an inner electrode 49.

First a fixing groove 421, a first groove 422 and a second groove 423 are sequentially disposed on the upper surface of the mounting seat of the atomization cotton 42 from outside to inside, and all of the fixing grooves 421, the first grooves 422 and the second grooves 423 are symmetrically disposed independently, the first groove 422 is communicated with the second groove 423, the first groove 422 is opposite to the liquid outlet 321 of the liquid cartridge device 3, and the gas inlet opening of the second groove 423 is communicated with the atomization cavity 50, so gas in the atomization cavity 50 can enter a liquid cartridge via the second groove 423, the first groove 422, and the liquid outlet 321 to replace e-liquid, thereby ensuring a stable flow rate of the e-liquid. After two ends of the atomization cotton 41 are suspended and cover the first groove 422 and the second groove 423, the ends are inserted into the first fixing groove 421, and the middle part of the atomization cotton 41 is recessed under the action of a spring 7, and is in contact with the ultrasonic atomization piece 43 horizontally placed in the atomization seat 44 to form an atomization zone, so that an atomization cavity 50 is formed between the upper surface of the ultrasonic atomization piece 43 and the lower surface of the outer liquid cartridge shell 32. After the two ends of the atomization cotton 41 cover the first groove 422 and the second groove 423, two sides of the two ends of the atomization cotton 41 are pressed against the end face of the liquid outlet of the outer liquid cartridge shell 32 by the top end face of the mounting seat of the atomization cotton 42, and the pressed parts on the two sides of the ends of the atomization cotton 41 are pressed too tight to guide e-liquid, so the e-liquid guiding zone of the atomization cotton 41 only includes the positions corresponding to the first groove 422 and the second groove 423. Thus, the flow of the e-liquid can be controlled, the ultrasonic atomization piece 43 will not be soaked in the e-liquid. Meanwhile the atomization cotton 41 can also be prevented from falling into the first groove 422 or the first groove 422, so that the speed of replacement between e-liquid and gas in the liquid cartridge and the liquid guide speed will not be affected, thus dry burning of the ultrasonic atomization piece 43 will not occur.

The gas outlet of the first groove 422 is greater than the liquid outlet 321, preferably twice the diameter of the liquid outlet 321, to prevent the first groove 422 from being blocked by e-liquid to affect the gas replacement at the liquid outlet 321; the gas inlet of the first groove 422 is smaller than that of the second groove 423, so that e-liquid droplets in the first groove 422 can be discharged out through the second groove 423, to prevent the first groove 422 from being blocked by the e-liquid droplets.

A second fixing groove 441 and a limiting ring 442 are disposed at the upper part of the inner cavity of the atomization seat 44, and an insertion end 443 is disposed at the lower part of the atomization seat 44. The atomization seat 44 is inserted into the inner cavity of the connecting electrode 47 through its insertion end 443, so that the atomization seat 44 is stably placed on the top of the connecting electrode 47. The ultrasonic atomization piece 43 is nested in the second fixing groove 441 of the atomization seat 44 and abutted and limited by the limiting ring 442, which can effectively prevent the ultrasonic atomization piece 43 from falling out of the atomization seat 44 or moving therein, then effectively avoid the phenomena of tilting of the ultrasonic atomization piece that is not assembled stably and dry burning caused by insufficient contact with the e-liquid, and improve the stability of the assembled ultrasonic atomization piece.

The lower surface of the mounting seat of the atomization cotton 42 is connected to the outer electrode 45, the upper part of the outer electrode 45 is sleeved on the atomization seat 44, the upper end of the outer electrode 45 straddles the top surface of the atomization seat 44 and is provided with a downward bent abutting portion 451, a convex conductive ring 452 is disposed on the abutting portion 451, and the outer electrode 45 abuts against an upper surface electrode of the ultrasonic atomization piece 43 through the conductive ring 452 to realize electrical connection. The lower part of the outer electrode 45 is connected to the connecting electrode 47, a fourth groove 471 is disposed at the middle part of the connecting electrode 47, and a slightly higher support platform 472 is disposed on the inner side of the fourth groove 471. A lower surface electrode of the ultrasonic atomization piece 43 is connected to the inner electrode 49. The inner electrode 49 includes an electrode holder 491, and an elastic electrode 492 abutting against the lower surface electrode of the ultrasonic atomization piece 43 is disposed at the middle part of the electrode holder 491. The inner electrode 49 is mounted in the inner cavity of the connecting electrode 47, and an insulating ring 48 is disposed between the connecting electrode 47 and the inner electrode 49. A clamping column 4912 is disposed on the electrode holder 491, a boss 4911 is disposed on the top of the clamping column 4912, an insertion port 461 and a clamping port 462 are disposed on the resistance board 46, and the insertion port 461 is connected to the clamping port 462. The resistance board 46 is sleeved on the clamping column 4912 of the electrode holder 491 via the insertion port 461, and is clamped and fixed with the boss 4911 via the clamping port 462, and abuts against the support platform 472 of the connecting electrode 47, so as to realize electrical connection of the resistor on the resistance board 46 with the connecting electrode 47 and electrical connection of the resistor and the inner electrode 49. Two ends of the resistor are respectively connected with the upper and lower surface electrodes of the ultrasonic atomization piece 43, so that a closed circuit is formed between the ultrasonic atomization piece 43 and the resistor. In this way, the resistor can consume the energy stored by the ultrasonic atomization piece 43 itself after powered on, so that the ultrasonic atomization piece 43 can work normally after powered on again, the ultrasonic atomization piece 43 can be prevented from being shocked by extreme voltage, and the service life of the ultrasonic atomization piece 43 can be prolonged.

A gas inlet of the atomization cavity 501 and a gas outlet of the atomization cavity 502 are disposed on the outer liquid cartridge shell 32 corresponding to the atomization cavity 50. The gas inlet of the atomization cavity 501 is spaced apart from the liquid outlet 321 of the liquid cartridge by 90 degrees. In this way, the gas flow speed at the gas inlet of the atomization cavity 501 does not affect the flow rate of e-liquid on the atomization cotton 41, and does not affect the distribution of e-liquid on the atomization zone of the ultrasonic atomization piece 43, so that the stability of an e-liquid flow guide speed is better, the ultrasonic atomization piece 43 can be prevented from being soaked in e-liquid, and the atomization efficiency can be improved. Meanwhile, the gas flow between the gas inlet of the atomization cavity 501 and the gas outlet of the atomization cavity 502 has a turning 503, and this gas flow has little effect on the flowing force of air closed to the ultrasonic atomization piece 43, so the gas flow has little effect on the flow rate of e-liquid on the atomization zone of the ultrasonic atomization piece 43, and the atomizing rate of the ultrasonic atomization piece 43 is stable, thereby reducing the probability that a user inhales the e-liquid.

The gas outlet of the atomization cavity 502 is opposite to the central position of the ultrasonic atomization piece 43 and the central position of the atomization cotton 41, so the smoke atomized by the ultrasonic atomization piece 43 is directly discharged out from the gas outlet of the atomization cavity 502, the temperature of the smoke reaching the user's mouth is approximately 25 to 38 degrees Celsius, and the smoke at this temperature has better taste.

A rotatable handle 6 is disposed at the middle part of the liquid cartridge device 3, a suction nozzle device 1 is sleeved on the top of the rotatable handle 6, and the suction nozzle device 1 is rotatable around the rotatable handle 6, to close or open the liquid inlet of the liquid cartridge device 3. A gas outlet channel 61 communicated with the suction nozzle 11 and the gas outlet of the atomization cavity 502 is disposed at the middle part of the rotatable handle 6, and a gas inlet channel 62 communicated with the gas inlet 12 and the gas inlet of the atomization cavity 501 are disposed on the periphery of the rotatable handle 6. The diameter of the gas outlet of the atomization cavity 502 is greater than that of the gas outlet channel 61. In this way, the gas outlet of the atomization cavity 502 can collect splashing e-liquid droplets that are not fully atomized in the ultrasonic atomization process of the ultrasonic atomization piece 43, and the gas flow at the gas outlet of the atomization cavity 502 changes rapidly, the probability of collision of smoke is increased, and large particles of smoke are condensed on the side wall of the gas outlet of the atomization cavity 502, which prevents the user from inhaling the e-liquid particles, thereby improving smoke taste.

When the present invention is used, a smoker puffs from the suction nozzle 11, thus outside air enters from the gas inlet 12 and enters the atomization cavity 50 via the gas inlet channel 62 and the gas inlet of the atomization cavity 501, and e-liquid flows to the atomization cotton 41 from the liquid outlet 321 of the liquid cartridge, flows to the middle part of the atomization cotton in contact with the ultrasonic atomization piece 43 via the atomization cotton 41 corresponding to the first and second grooves, is atomized by ultrasonic, then flows to the suction nozzle 11 via the gas outlet of the atomization cavity 502 and the gas outlet channel 61 and is inhaled by the smoker.

Embodiment 2

Figure 13:
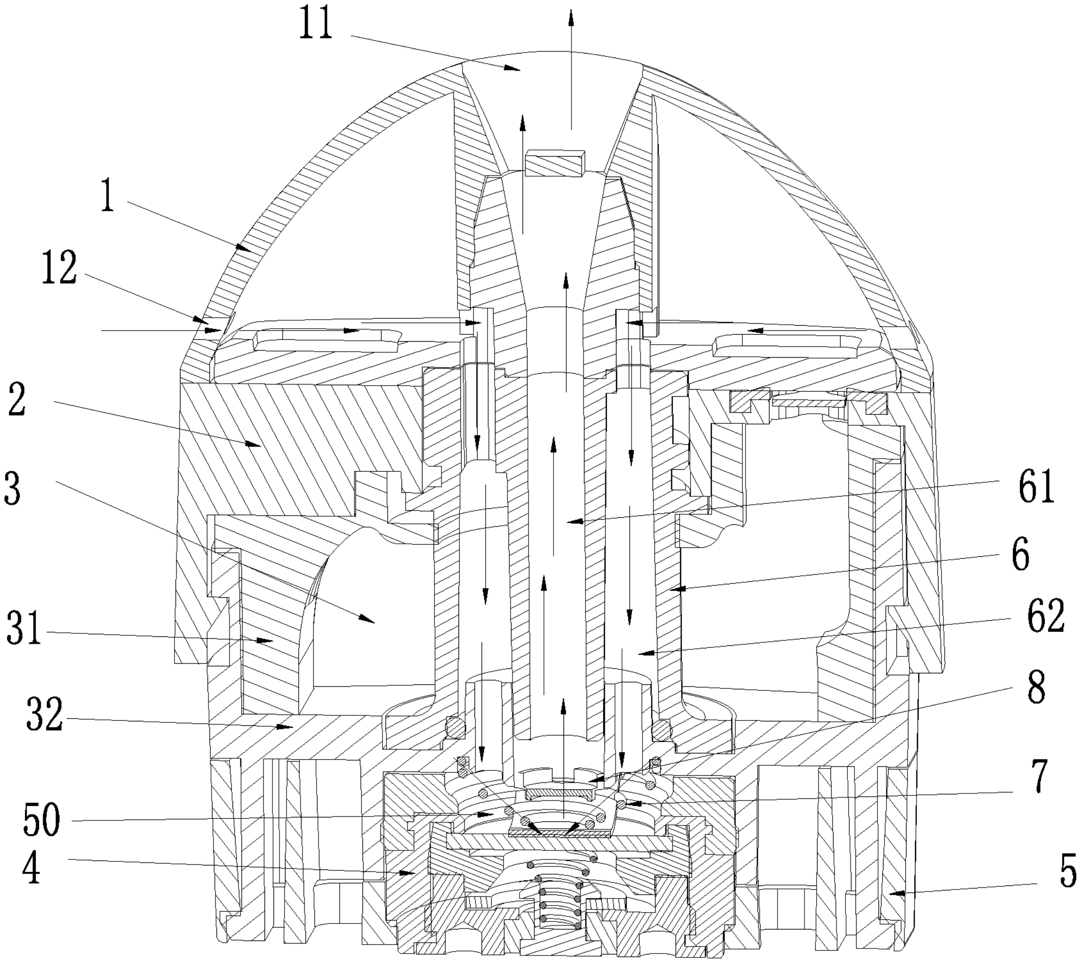
FIG. 13 is a three-dimensional cross-sectional structural diagram of a second embodiment of an atomizer for an electronic cigarette according to the present invention.

As shown in FIG. 13, the general structure of the second embodiment of the atomizer for an electronic cigarette according to the present invention is the same as that of the first embodiment, except that a gas distribution valve 8 is disposed at the joint of the gas outlet channel 61 and the atomization cavity 50, that is, at the gas outlet of the atomization cavity 502.

Figure 14:
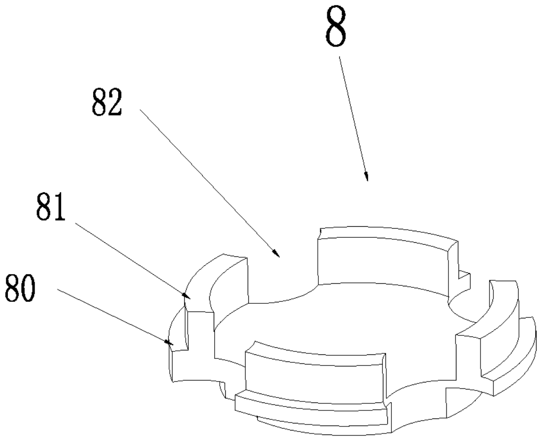
FIG. 14 is a three-dimensional structural diagram of a gas distribution valve.
Figure 15:
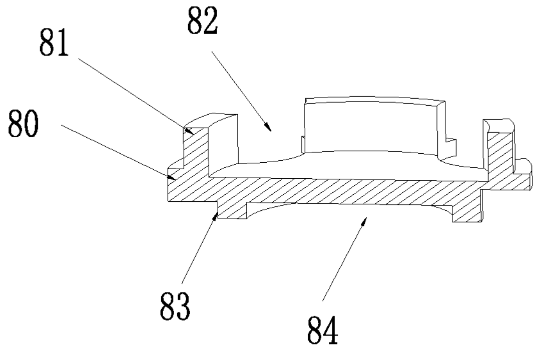
FIG. 15 is a three-dimensional cross-sectional structural diagram of the gas distribution valve.

As shown in FIGS. 14 and 15, the gas distribution valve 8 includes a disc-shaped body 80, a fixed section 81 disposed on the upper surface of the disc-shaped body and extending upward, and at least one groove 82 penetrating through the disc-shaped body 80 and the fixed section 81. In this embodiment, there are four grooves 82, and the grooves 82 are evenly distributed on the gas distribution valve 8, which can ensure a stable gas flow when the gas is discharged.

A circular ring 83 extends downward on the lower surface of the disc-shaped body 80, the circular ring 83 and the lower surface of the disc-shaped body 80 form a smoke blocking groove 84, and the groove 82 passes through the outer side of the circular ring 83 and is not communicated with the smoke blocking groove 84.

The gas outlet channel 61 is communicated with the atomization cavity 50 through the groove 82, and the smoke blocking groove 84 is located just above the atomization zone of the ultrasonic atomization piece 43.

Figure 16:
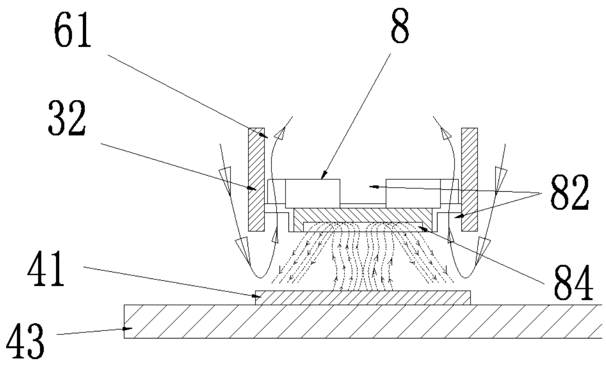
FIG. 16 is a flow direction diagram of gas and smoke at the gas distribution valve.

As shown in FIG. 16, the distance between the smoke blocking groove 84 on the gas distribution valve 8 and the ultrasonic atomization piece 43 is 1 mm to 20 mm, and is 5 mm to 10 mm in this embodiment. The smoke blocking groove 84 faces the central area of the ultrasonic atomization piece 43. The ultrasonic atomization piece 43 ultrasonically atomizes the e-liquid on the atomization cotton 41 placed in its central area to form smoke, which is sprayed out. When the distance between the smoke blocking groove 84 and the ultrasonic atomization piece 43 is shorter, the sprayed smoke is more easily blocked by the smoke blocking groove 84 and then reflected into the atomization cavity 50, so that large e-liquid droplets adhere to the inner wall of the atomization cavity 50, which in turn reduces the phenomenon that the user inhales the e-liquid. When the distance between the smoke blocking groove 84 and the ultrasonic atomization piece 43 is shorter, the cross area between the smoke blocked and reflected by the smoke blocking groove 84 and the gas flow flowing through the atomization cavity 50 is larger, and the smoke blocked and reflected by the smoke blocking groove 84 and is blocked again by the ultrasonic atomization piece 43 to form secondary reflection. The smoke after the secondary reflection crosses the gas flow, so the gas flow can quickly bring the smoke out of the groove 82. Such a setting can not only block the e-liquid droplets, that are not fully atomized during the operation of the ultrasonic atomization sheet 43 or splash out, from directly entering the gas outlet channel 61 to prevent the user from inhaling the e-liquid, but also can enable the smoke blocked and reflected by the smoke blocking groove 84 to be more delicate, thereby improving smoke taste.

The forgoing descriptions are only preferred embodiments of the present application, and do not limit the present application in any form. Although the present application is disclosed above with the preferred embodiments, the present application is not limited thereto. Some variations or modifications made by any skilled person familiar with the art using the disclosed technical contents without departing from the scope of the technical solution of the present application are equivalent to the embodiments, and all fall within the scope of the technical solution.

The invention claimed is:

1. An atomizer for an electronic cigarette, comprising a liquid cartridge device with a liquid outlet, atomization cotton, and an ultrasonic atomization piece, wherein:

a middle part of the atomization cotton abuts against a central area of the ultrasonic atomization piece by a spring to form an atomization zone, and an end portion of the atomization cotton is pressed against a bottom of the liquid cartridge device and covers the liquid outlet;

an atomization cavity is formed between the ultrasonic atomization piece and the bottom of the liquid cartridge device, and a gas inlet of the atomization cavity and a gas outlet of the atomization cavity are disposed at a top of the atomization cavity;

characterized in that: the gas inlet of the atomization cavity is misaligned with the liquid outlet, and an angle between the gas inlet of the atomization cavity and the liquid outlet is in a range of 30 to 180 degrees, so that the gas flow direction at the gas inlet of the atomization cavity is misaligned with the flow direction of an e-liquid on the atomization cotton; and a gas flow between the gas inlet of the atomization cavity and the gas outlet of the atomization cavity has a turning.

2. The atomizer for the electronic cigarette according to claim 1, wherein the gas outlet of the atomization cavity is disposed at a central position facing the atomization zone.

3. The atomizer for the electronic cigarette according to claim 1, wherein:

the gas outlet of the atomization cavity is connected to a gas outlet channel, and the diameter of the gas outlet of the atomization cavity is greater than that of the gas outlet channel.

4. The atomizer for the electronic cigarette according to claim 1, wherein:

the end portion of the atomization cotton is pressed against the bottom of the liquid cartridge device by a mounting seat of the atomization cotton, a groove that is opposite to the liquid outlet and is communicated with the atomization cavity is disposed on the upper surface of the mounting seat of the atomization cotton, the middle of the end portion of the atomization cotton is suspended and covers the groove, and two sides of the end portion of the atomization cotton are pressed against an end face of the liquid outlet of the liquid cartridge device, so that only the position on the atomization cotton corresponding to the groove is an e-liquid guiding zone of the atomization cotton.

5. The atomizer for the electronic cigarette according to claim 4, wherein:

the groove comprises a first groove and a second groove communicated with each other, both of the first groove and the second groove are symmetrically disposed on the upper surface of the mounting seat of the atomization cotton, and the gas inlet of the first groove is smaller than the gas inlet of the second groove.

6. The atomizer for the electronic cigarette according to claim 5, wherein the gas outlet of the first groove is greater than the diameter of the liquid outlet.

7. The atomizer for the electronic cigarette according to claim 5, wherein:

first fixing grooves are further symmetrically disposed on an upper surface of the mounting seat of the atomization cotton, and two ends of the atomization cotton are respectively inserted into the first fixing grooves and cover the first groove and the second groove.

8. The atomizer for the electronic cigarette according to claim 7, wherein the first fixing grooves, the first groove, and the second groove are sequentially disposed on the upper surface of the mounting seat of the atomization cotton from outside to inside.

9. The atomizer for the electronic cigarette according to claim 1, wherein:

the ultrasonic atomization piece is disposed on an atomization seat, a second fixing groove and a limiting ring are disposed on the atomization seat, and the ultrasonic atomization piece is nested in the second fixing groove and limited in the atomization seat through the limiting ring.

10. The atomizer for the electronic cigarette according to claim 1, wherein:

an upper surface electrode of the ultrasonic atomization piece is electrically connected to an outer electrode, a lower surface electrode of the ultrasonic atomization piece is electrically connected to an inner electrode, a resistance board is clamped between the outer electrode and the inner electrode, a resistor is disposed on the resistance board, one end of the resistor is electrically connected to the upper surface electrode of the ultrasonic atomization piece via the outer electrode, and the other end of the resistor is electrically connected to the lower surface electrode of the ultrasonic atomization piece via the inner electrode, so that a closed circuit is formed between the ultrasonic atomization piece and the resistor.

11. An atomizer for an electronic cigarette, comprising a liquid cartridge device with a liquid outlet, atomization cotton, and an ultrasonic atomization piece, wherein:

a middle part of the atomization cotton abuts against a central area of the ultrasonic atomization piece by a spring to form an atomization zone, and an end portion of the atomization cotton is pressed against a bottom of the liquid cartridge device and covers the liquid outlet;

an atomization cavity is formed between the ultrasonic atomization piece and a bottom of the liquid cartridge device, and a gas inlet of the atomization cavity and a gas outlet of the atomization cavity are disposed at a top of the atomization cavity; characterized in that:

the gas inlet of the atomization cavity is misaligned with the liquid outlet, so that the gas flow direction at the gas inlet of the atomization cavity is misaligned with the flow direction of an e-liquid on the atomization cotton, and a gas flow between the gas inlet of the atomization cavity and the gas outlet of the atomization cavity has a turning; and a gas distribution valve is disposed at the gas outlet of the atomization cavity, at least one groove is disposed on the periphery of the gas distribution valve, and the gas outlet of the atomization cavity is communicated with the atomization cavity through the groove.

12. The atomizer for the electronic cigarette according to claim 11, wherein a smoke blocking groove for preventing smoke from directly spraying out of the atomization cavity is disposed at a bottom of the gas distribution valve.

13. The atomizer for the electronic cigarette according to claim 11, wherein the distance between the smoke blocking groove and the ultrasonic atomization piece is 1 mm to 20 mm.

* * * * *